United States Patent
Schwarz et al.

(10) Patent No.: US 11,029,921 B2
(45) Date of Patent: Jun. 8, 2021

(54) PERFORMING PROCESSING USING HARDWARE COUNTERS IN A COMPUTER SYSTEM

(71) Applicant: INTERNATIONAL BUSINESS MACHINES CORPORATION, Armonk, NY (US)

(72) Inventors: Eric M. Schwarz, Gardiner, NY (US); Silvia M. Mueller, Altdorf (DE); Ulrich Mayer, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 16/275,818

(22) Filed: Feb. 14, 2019

(65) Prior Publication Data

US 2020/0264842 A1      Aug. 20, 2020

(51) Int. Cl.
*G06F 7/60*       (2006.01)
*G06F 7/72*       (2006.01)

(52) U.S. Cl.
CPC .............. *G06F 7/607* (2013.01); *G06F 7/722* (2013.01); *G06F 7/729* (2013.01)

(58) Field of Classification Search
CPC .......... G06F 7/607; G06F 7/721; G06F 7/722; G06F 7/729; H04L 9/0631; H04L 9/0637; H04L 9/3033
See application file for complete search history.

(56) References Cited

U.S. PATENT DOCUMENTS 6,088,453 A    7/2000 Shimbo
6,609,141 B1   8/2003 Montague
(Continued)

OTHER PUBLICATIONS

Merriam Webster Dictionary, results for associated, association, and in association with, https://www.merriam-webster.com/dictionary/association, and https://www.merriam-webster.com/dictionary/, 2020 download (Year: 2020).*

(Continued)

*Primary Examiner* — Aimee Li
*Assistant Examiner* — Emily E Larocque
(74) *Attorney, Agent, or Firm* — William Kinnaman; Matthew M. Hulihan; Heslin Rotherberg Farley & Mesiti PC

(57) ABSTRACT

Performing processing using hardware counters in a computer system includes storing, in association with greatest common divisor (GCD) processing of the system, a first variable in a first redundant binary representation and a second variable in a second redundant binary representation. Each such redundant binary representation includes a respective sum term and a respective carry term, and a numerical value being represented by a redundant binary representation is equal to a sum of the sum and carry terms of the redundant binary representation. The process performs redundant arithmetic operations of the GCD processing on the first variable and second variables using hardware counter(s), of the computer system, that take input values in redundant binary representation form and provide output values in redundant binary representation form. The process uses output of the redundant arithmetic operations of the GCD processing to obtain an output GCD of integer inputs to the GCD processing.

20 Claims, 8 Drawing Sheets

(56) References Cited

U.S. PATENT DOCUMENTS

| | | | |
|---|---|---|---|
| 6,978,016 | B2 | 12/2005 | Chen |
| 7,050,579 | B1 | 5/2006 | Koc et al. |
| 7,508,936 | B2 | 3/2009 | Eberle et al. |
| 7,574,469 | B2 | 8/2009 | Lorencz |
| 9,906,359 | B2 | 2/2018 | Gueron |
| 2001/0054052 | A1 | 12/2001 | Arazi |
| 2003/0219118 | A1 | 11/2003 | Beverly |
| 2008/0114820 | A1* | 5/2008 | Amin .................. G06F 7/722 708/209 |

OTHER PUBLICATIONS

D. Patterson el al., Computer Organization and Design, the Hardware/Software Interface, Elsevier, 3rd ed., 2005 (Year: 2005).*

M. Ercegovac et al., Digital Arithmetic, Elsevier Science & Technology, 2003 (Year: 2003).*

L. Tawalbeh et al., An Algorithm and Hardware Architecture for Integrated Modular Division and Multiplication in GF(p) and GF (2n), IEEE, 2004 (Year: 2004).*

M. Mohamed, High Performance Hardware for Modular Division/Inverse, Thesis, King Fahd University of Petroleum & Minerals, 2015 (Year: 2015).*

S.J. Park, Hardware Design of Scalable and Unified Modular Division and Montgomery Multiplication, Thesis, Oregon State University, 2005 (Year: 2005).*

Wei, S., "Computation of modular multiplicative inverses using residue signed-digit additions", 2016 International SoC Design Conference (ISOCC), 2016 IEEE, pp. 85-86.

Menezes, A., et al., The Handbook of Applied Cryptography, Chapter 14, p. 608, CRC Press, 1996, 2 pgs.

Mell, Peter, et al., "The NIST Definition of Cloud Computing", NIST Special Publication 800-145, Sep. 2011, Gaithersburg, MD, 7 pgs.

* cited by examiner

PERFORMING PROCESSING USING HARDWARE COUNTERS IN A COMPUTER SYSTEM

BACKGROUND

Cryptography implementations such as RSA and Elliptic-curve use modular arithmetic operations. A complex modular arithmetic operation, requiring significant delay, is the inverse to multiplication, i.e. finding the modular multiplicative inverse of a number. In a modular system, there is finite number of elements and they are limited by the 'field'. In cryptographic applications, the field is typically chosen to be limited by a prime number. The National Institute of Standards and Technology recommends several primes in the form of "elliptic curves", such as P-256, P-384, and P-521. In P-521, the format is 521 bits wide. An element in P-521 is 521 bits wide and a modular multiplication results in a product within that same field. Modular multiplication operations in this context are relatively difficult to perform. If the intermediate product is greater than the prime of P-521, it is wrapped around the field potentially multiple times to yield the remainder as if the product was divided by the prime. The multiplicative inverse operation produces the counterpart of a number such that a product of the number and its counterpart is equal to 1 within the field. Thus, the modular multiplicative inverse of a number A modulo n is B such that A*B=1 (mod n). By way of example, in a modulo 7 system the modular multiplicative inverse of 2 is 4, since 2*4=8=1 (mod 7).

There are several approaches for determining a modular multiplicative inverse. One such approach involves modular exponentiation and says $A^{-1}$ (the modular multiplicative inverse of A) is equal to $A^{p-2}$ (mod p). A determination under this approach would involve a significant number of modular multiplications and additions. Another approach uses an extended GCD (greatest common divisor) algorithm. However, inefficiencies exist in implementations of the extended GCD algorithm.

SUMMARY

Shortcomings of the prior art are overcome and additional advantages are provided through the provision of a computer-implemented method to facilitate processing of a computer system. The method stores, in association with greatest common divisor (GCD) processing of the computer system, a first variable of the GCD processing in a first redundant binary representation and a second variable of the GCD processing in a second redundant binary representation. Each redundant binary representation of the first and second redundant binary representations includes a respective sum term and a respective carry term. A numerical value being represented by a redundant binary representation is equal to a sum of the sum term and the carry term of the redundant binary representation. The method performs redundant arithmetic operations of the GCD processing on the first variable and the second variable using one or more hardware counters, of the computer system, that take input values in redundant binary representation form and provide output values in redundant binary representation form. The method also uses output of the redundant arithmetic operations of the GCD processing to obtain an output GCD of integer inputs to the GCD processing. These aspects have advantages in that the use of hardware counters result in efficient GCD and modular multiplicative inverse processing.

Yet further, a computer program product is provided to facilitate processing of a computer system. The computer program product includes a computer readable storage medium readable by a processing circuit and storing instructions for execution by the processing circuit for performing a method. The method stores, in association with greatest common divisor (GCD) processing of the computer system, a first variable of the GCD processing in a first redundant binary representation and a second variable of the GCD processing in a second redundant binary representation. Each redundant binary representation of the first and second redundant binary representations includes a respective sum term and a respective carry term. A numerical value being represented by a redundant binary representation is equal to a sum of the sum term and the carry term of the redundant binary representation. The method performs redundant arithmetic operations of the GCD processing on the first variable and the second variable using one or more hardware counters, of the computer system, that take input values in redundant binary representation form and provide output values in redundant binary representation form. The method also uses output of the redundant arithmetic operations of the GCD processing to obtain an output GCD of integer inputs to the GCD processing. These aspects have advantages in that the use of hardware counters result in efficient GCD and modular multiplicative inverse processing.

Yet further, a computer system is provided that includes a memory and a processor in communication with the memory, where the computer system is configured to perform a method to facilitate processing of the computer system. The method stores, in association with greatest common divisor (GCD) processing of the computer system, a first variable of the GCD processing in a first redundant binary representation and a second variable of the GCD processing in a second redundant binary representation. Each redundant binary representation of the first and second redundant binary representations includes a respective sum term and a respective carry term. A numerical value being represented by a redundant binary representation is equal to a sum of the sum term and the carry term of the redundant binary representation. The method performs redundant arithmetic operations of the GCD processing on the first variable and the second variable using one or more hardware counters, of the computer system, that take input values in redundant binary representation form and provide output values in redundant binary representation form. The method also uses output of the redundant arithmetic operations of the GCD processing to obtain an output GCD of integer inputs to the GCD processing. These aspects have advantages in that the use of hardware counters results in efficient GCD and modular multiplicative inverse processing.

Additional features and advantages are realized through the concepts described herein. For instance, in some embodiments a first integer input of the integer inputs to the GCD processing includes a modulus, m, and a second integer input of the integer inputs includes a number, a, for which a modular multiplicative inverse is to be determined. The method further includes determining the modular multiplicative inverse of a modulo m based on the obtained output GCD. For instance, based on the output GCD being equal to 1, the determining identifies the modular multiplicative inverse of a modulo m as another output, D, of the GCD processing. An advantage of these aspects is that the efficient GCD processing can be applied to efficiently determine a modular multiplicative inverse of input number a modulo m.

In some embodiments, the one or more hardware counters of the computer system are a single (4,2) hardware counter, where the (4,2) hardware counter takes four input addends and reduces the four input addends to two output addends. An embodiment in which a single (4,2) hardware counter is used has an advantage that it requires relatively little or minimal hardware to implement addition operations. In yet further embodiments, the single (4,2) hardware counter is implemented as two (3,2) counters in hardware, each of the two (3,2) counters taking three input addends and reducing the three input addends to two output addends. An embodiment using two (3,2) hardware counters still has advantages over, e.g. non-redundant arithmetic using a full adder, since the adder implements non-redundant arithmetic which is slower than redundant arithmetic operations performed by a hardware counter.

In some embodiments, the one or more hardware counters include first and second (4,2) hardware counters, and using the first and second (4,2) hardware counters uses the first (4,2) hardware counter to perform addition operations using the first variable and uses the second (4,2) hardware counter to perform addition operations using the second variable. An embodiment using two single (4,2) hardware counters rather than just one (4,2) counter has an advantage that it can perform processing of aspects of the algorithm in parallel.

In some embodiments, the redundant arithmetic operations include subtraction operations implemented as additions using two's complement representations of subtrahends of the subtraction operations. The first variable is a subtrahend of a subtraction operation of the subtraction operations, and the subtraction operation is implemented as an addition using two's complement representations of the sum term and the carry term of the first redundant binary representation of the first variable, in which, for each of the sum term and the carry term, a bitwise inversion of the respective term is added with 1 to a minuend of the subtraction operation. An embodiment implementing subtraction operations as addition operations using the two's complement has an advantage in that it enables the subtraction operations to be performed relatively fast using the hardware counter(s), thus providing the performance benefits of non-redundant arithmetic using hardware counter(s) rather than non-redundant arithmetic using, e.g., a full adder.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
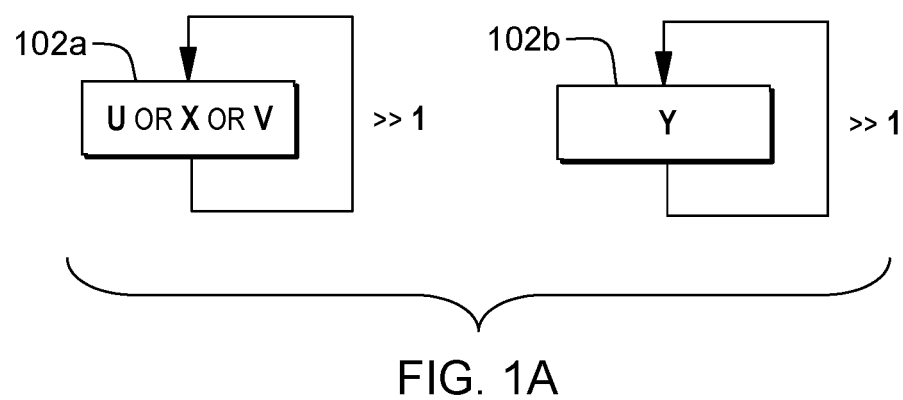
FIGS. 1A-1B depicts conceptual representations of at least some example hardware in a computer system to perform greatest common divisor processing of the computer system.

Described herein are approaches for greatest common divisor (GCD) processing, for instance in association with determination of a modular multiplicative inverse of a given number. Variables of the GCD processing are stored in redundant binary representation form, and redundant arithmetic operations, including subtractions implemented as two's complement additions, are performed using the variables in their redundant binary representation form.

A version of an extended GCD algorithm is presented herein and its implementation optimized to specific computer hardware embodiments. For instance, hardware counters and redundant arithmetic operations are leveraged to improve speed of intermediate calculations and result in a much faster implementation than alternative designs, thereby providing improvements to computer systems at least in that their processing is made faster, simpler, and more efficient in terms of hardware resource usage and time consumption. Counters and redundant arithmetic are used to operate against variables in redundant binary representation form with a carry-save format, as opposed to non-redundant binary representations. Results in the redundant (carry-save) format are not reduced until a later portion of the GCD processing. This minimizes the calculation per step of the algorithm. In addition, subtraction operations are implemented as additions using two's complement representations.

Those having ordinary skill in the art will recognize that the redundant binary representation system differs from typical binary numeral systems that use an individual bit per each digit. When dealing with relatively large bit widths, arithmetic operations on redundant binary representations can be performed significantly faster than arithmetic operations on non-redundant representations. For instance, propagation of carries through the full bit width during addition operations is avoided.

An example extended GCD algorithm for use in finding the modular multiplicative inverse, z, of integer, a, mod n is provided as follows:

```
>> Inverse of a mod n = z, set x = n, set y = a, then z= D:
>> While (x is even and y is even) {x >>= 1; y >>=1;} //arithmetic right shift by 1
>> Set u = x; v = B = 0; D = 1;
>> While (u != 0) {
>>         While (u is even) {
>>                 u >>= 1;
>>                 If (B is odd) {B = B - x,}
>>                 B >>= 1; }
```

```
>>       While (v is even) {
>>           v >>= 1;
>>           If (D is odd) {D = D - x;}
>>           D >>= 1; }
>>       If (u >= v) {u = u - v; B = B - D,} else {v = v - u; D = D - B;}
>> } // END while (u != 0) loop
>> If (D > 0) {D = D;} else {D = D + x;} //the add x is to get D back to
positive
>> Return D; v is the GCD of n and a; if v == 1, then D is modular
multiplicative inverse, otherwise v is not equal to 1 and therefore a and n are not co-
prime.
```

The above algorithm is defined for integers and not defined for binary arithmetic; there is no reduction based on a binary number system.

When dealing with non-redundant binary numbers and a relatively large width, e.g. 521 bits, a seemingly simple add or subtract could take many computational cycles to implement, leading to inefficiencies in processing the operations and, ultimately, modular multiplicative inverses of inputs.

In accordance with aspects described herein, a hardware implementation of GCD processing is provided to overcome inefficiencies and improve operation of computer systems that otherwise perform conventional GCD processing.

Redundant binary representations, having a sum and a carry term, where a numerical value represented is equal to the sum of the two terms, are used to represent the B and D variables in the above. Each of B and D are represented as a sum of two respective terms—the sum term and carry term of their respective representation. In contrast to a binary number system requiring that carries be propagated all the way to the most significant bit, taking potentially several (e.g. more than 10) cycles to accomplish, the redundant binary representations result in far fewer (e.g. one or two) bits of propagation on a carry.

In approaches described herein, B is represented as BS+BC (BS=$B_{sum\ term}$ and BC=$B_{carry\ term}$) rather than just B, and D is represented as DS+DC (DS=$D_{sum\ term}$ and DC=$D_{carry\ term}$) rather than just D. By doing so, counter/compressor trees can be implemented to perform the reductions involved in arithmetic operations, for instance addition operations.

By way of example, some details of 521-bit 3:2 and 4:2 counters are provided. Bitwise, they are independent.

Assume a 3:2 counter with inputs X, Y, and Z, and outputs S and C:

$Si <= Xi$ xor $Yi$ xor $Zi$ for $i=0$ to 520 for a 521 bit counter;

$Ci <= (Xi$ and $Yi)$ or $(Xi$ and $Zi)$ or $(Yi$ and $Zi)$ for all $i$

For a 4:2 counter built out of 3:2 counters, assume W, X, Y, Z as inputs:

$Si', Ci' <= (Xi, Yi, Zi)$, as above;

then Si, Ci<=(Wi, Si', Ci') substituting Wi for Xi, Si' for Yi, and Ci' for Zi in the above equations.

As can be seen, the i-th bit is independent of any other bit; bit 0 for instance is not dependent on bit 520.

An example GCD algorithm that can be used in finding the modular multiplicative inverse, z, of integer, a, mod n in accordance with aspects described herein is provided as follows:

```
>> Find inverse of a (mod n) = z, set x = n and set y = a, then z = D output
from algorithm:
>> While (x lsb == 0 and y lsb == 0) {x >>= 1; y >>= 1;}
>> u = x; v = y; B = 0 (B = BS+BC); D = 1 (D = DS+DC, DS = 1, DC = 0);
>> While (u != 0) {
>>       While (u lsb == 0) {
>>           u shift right 1 bit;
>>           If (BS lsb == 1) {BS + BC <= BS +BC + x' + 1;}
>>           BS, BC shift right 1 bit; }   // arithmetic shift on each
>>       While (v lsb == 0) {
>>           v shift right 1 bit;
>>           If (DS lsb == 1) {DS + DC <= DS+DC + x' + 1;}
>>           DS, DC shift right 1 bit; }
>>       R = u - v;
>>       If (R >= 0) {u = R; BS + BC <=BS +BC + DS' + DC' + 2;} else {v =
R'+ 1; DS + DC <=DS + DC + BS' + BC' + 2;}
>> } // END while (u != 0) loop
>> If (D > 0) {D = DS + DC;} else {D = DS + DC + x;}
>> Return D; v is the GCD of n and a; if v == 1, then D is modular
multiplicative inverse, otherwise v is not equal to 1 and therefore a and n are not co-
prime.
```

In the above, lsb denotes "least significant bit". In the line 'While (x lsb==0 and y lsb==0) {x>>=1; y>>=1;}', the right shift by 1 effects a divide-by-2 operation. Breaking from this while loop occurs when at least one of x and y is odd. In a typical scenario where the inputs a and n are proper for purposes of modular multiplicative inverse determination, a and n are co-prime with n being a prime number greater than 2, and therefore this while loop is not entered.

In the line 'u=x; v=y; B=0 (B=BS+BC); D=1 (D=DS+DC, DS=1, DC=0);', the equation B=BS+BC indicates the redundant binary representation of B as maintained by the computer system. Setting B=0 sets both BS and BC to 0. D=DS+DC indicates the redundant binary representation of D as maintained by the computer system. Setting D=1 sets DS=1 and DC=0.

The line 'If (BS lsb==1) {BS+BC<=BS+BC+x'+1}' is an implementation of the line 'If (B is odd) {B=B−x;}' from the extended GCD algorithm set forth above. x' denotes a bit-wise inversion of the bits of variable x. x'+1 represents the two's complement of x, which is equivalent to −x (negative x). Therefore, the subtraction B−x from above is implemented as an addition using the two's complement representation of the subtrahend x. B, represented as BS and BC, takes the value of [BS+BC+the two's complement representation of x], which is effectively subtracting x from B.

The line 'R=u−v' represents a subtraction involving binary terms u and v. This can be implemented in a standard 2:1 adder in some examples. While such an adder can be relatively expensive, in this case the operation is expensive but occurs less frequent than the other steps. In alternatives, however, u and v are represented in redundant binary representations and a redundant arithmetic subtraction is performed.

In the line 'If (R>=0) {u=R; BS+BC<=BS+BC+DS'+DC'+2;} else {v=R'+1; DS+DC<=DS+DC+BS'+BC'+2;}', the statement BS+BC<=BS+BC+DS'+DC'+2 is the implementation of B=B−D in the extended GCD algorithm. The two's complement representation of D (DS+DC) is (DS'+1)+(DC'+1), which equals=DS'+DC'+2.

The line 'If (D>0) {D=DS+DC;} else {D=DS+DC+x;}' performs a two or three-input addition to produce a binary result that is the modular multiplicative inverse of the input binary number a if the GCD of input a and n is equal to 1. The addition operations may be implemented as, e.g., a 3:2 add followed by a 2:1 add, as an example.

Figure 1B:
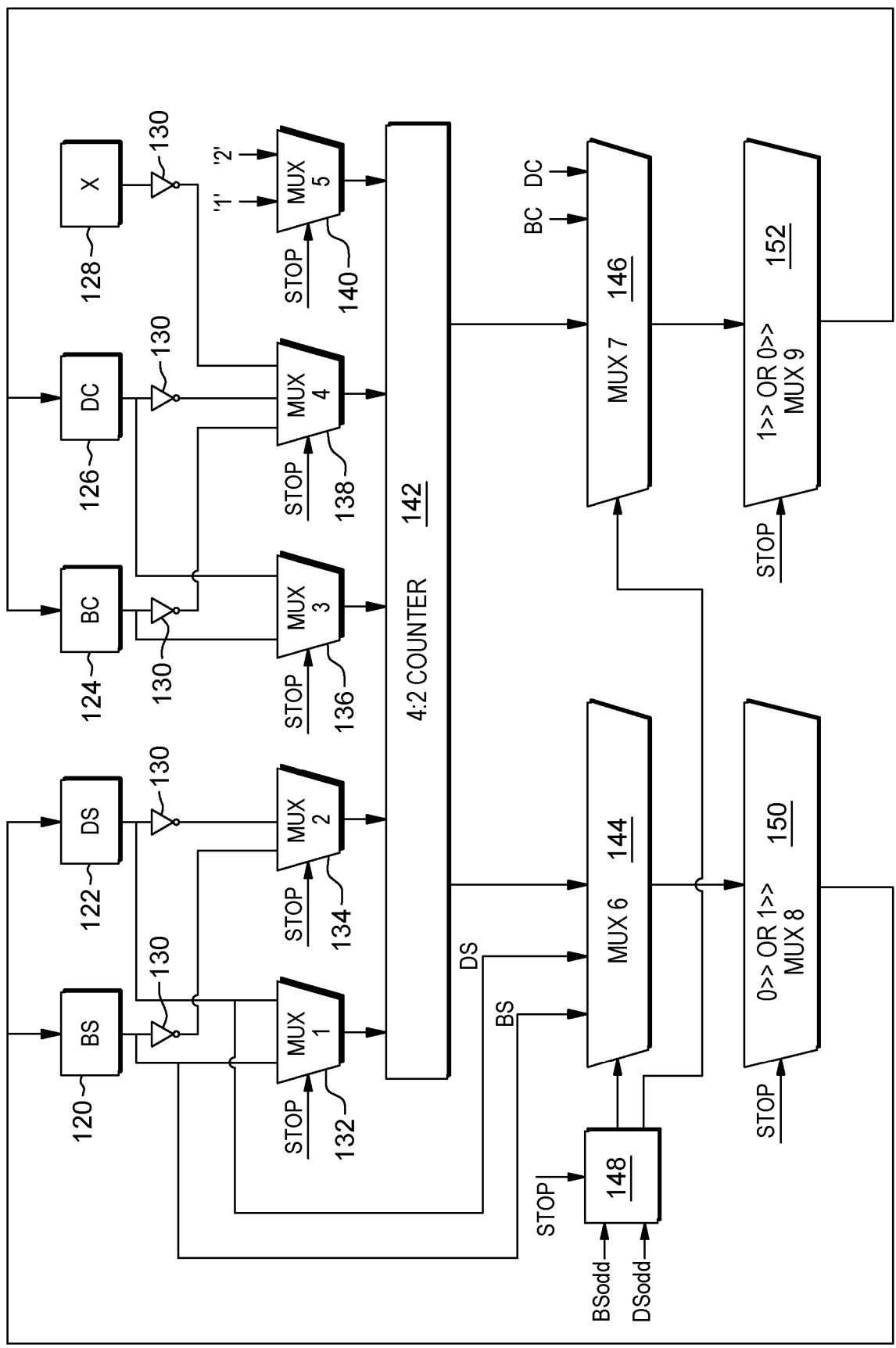

FIGS. 1A-1B depicts conceptual representations of at least some example hardware in a computer system to perform greatest common divisor processing of the computer system in accordance with aspects described herein. The figures point out the pertinent hardware, however those having ordinary skill in the art will recognize the presence of other hardware as needed.

FIG. 1A depicts registers 102a and 102b holding variables (U, V, X, Y) against which 1-bit right shift(s) may be performed, for instance to implement the 'While (x lsb==0 and y lsb==0) {x>>=1; y>>=1;}' portion of the algorithm or other shifts performed as part of the algorithm. As depicted, a variable is read out of a register to perform 1-bit right shift(s) against the variable. These can be incrementally performed, e.g. by known hardware circuitry, on the variable until it is determined that the result is odd, i.e. lsb==1. At that point the variable could be written back into the register, in these examples.

In many practical implementations, the input to the algorithm may be two numbers that are odd and coprime, in which case the processing associated with FIG. 1A may not need to be performed.

In particular examples in which the P-521 elliptic curve is followed, there are a plurality of registers that are each at least 521 bits wide. Some registers may be used to store different variables at different portions of processing the algorithm. In a specific embodiment, there are 6 registers for storing variables as follows: (i) a first register to store u/x, (ii) a second register to store v/y, (iii) a third register to store BS/DS, (iv) a fourth register to store BC/DC, (v) a fifth register to store x/BS/DS, and (vi) a sixth register to store 0/BC/DC. In some embodiments, several registers are used, where any of these registers can be read out to a particular operand register and result(s) of algorithm processing can be stored to any of these registers.

In another phase of the algorithm, 'While (u lsb==0)', i.e. while u is even, the following are performed: u is shifted right 1 bit; If (BS lsb==1) {BS+BC<=BS+BC+x'+1; and BS and BC are shifted right 1 bit. The 1-bit right shift on u can be performed as described with reference to FIG. 1A, as one example.

FIG. 1B conceptually represents example hardware to perform aspects described herein. FIG. 1B is described with reference to the following rewritten version of the algorithm above to aid in understanding FIG. 1B:

```
Step 1:         while x and y are even (e.g. lsb == 0), x>>1; y>>1
While u != 0:
Step 2:         while u is even (e.g. lsb == 0):
    Step 2a:        u>>1;
    Step 2b:        BS", BC" <- BS + BC + x' + 1
    Step 2c:        BS, BC <- (BS, BC) if BS even (lsb == 0) OR (BS", BC")
if BS odd (lsb != 0)
    Step 2d:        BS, BC <- BS, BC >> 1  // 1 bit shift of BS and BC
    //loop back to Step 2a if u is still even)
Step 3:         while v is even (e.g. lsb == 0):
    Step 3a:        v>>1;
    Step 3b:        DS", DC" <- DS + DC + x' + 1
    Step 3c:        DS, DC <- (DS, DC) if DS even (lsb == 0) OR (DS", DC")
if DS odd (lsb != 0)
    Step 3d:    DS, DC <- DS, DC >> 1  // 1 bit shift of DS and DC
    //loop back to Step 3a if v is still even)
Step 4:
    Step 4a: R = u - v;
    if R >= 0:
        Step 4b1: u = R;
        Step 4c1: (BS, BC) <- BS + BC + DS' + DC' +2;
    else (i.e. R < 0):
        Step 4b2: v = R' +1;
        Step 4c2: (DS, DC) <- DS + DC + BS' + BC' +2;
    If R != 0, loop back to Step 2;
Step 5 (i.e. R = 0):
    If D > 0:
        Step 5a: D = DS + DC;
    else:
        Step 5b: D = DS + DC + x;
Return D; if v == 1, then D is modular multiplicative inverse
```

Referring now to FIG. 1B, registers 120, 122, 124, 126 and 128 are shown with, in this example, values/variables BS, DS, BC, DC, and x, respectively. The value (BS) in register 120 is provided as input to multiplexor 132 (MUX 1) and multiplexor 144 (MUX 6). Components 130 are inverters ('not' gates). The value (BS) in register 120 is inverted and provided as input to multiplexor 134 (MUX 2). Similarly the value (DS) in register 122 is provided as input to MUX 1 and MUX 6, and the value (DS) in register 122 is inverted and provided as input to MUX 2. MUXs 1 and 6 therefore receive the values of BS and DS and MUX 2 receives the inverted values of BS and DS, i.e. BS', DS'.

Similarly, the value (BC) in register 124 is provided as input to multiplexor 136 (MUX 3) and multiplexor 146 (MUX 7), and is inverted and provided as input to multiplexor 138 (MUX 4). The value (DC) in register 126 is provided as input to MUX 3 and MUX 7, and is inverted and provided as input to MUX 4. MUXs 3 and 7 therefore receive the values of BC and DC and MUX 4 receives the inverted values of BC and DC, i.e. BC', DC'.

Multiplexor 140 (MUX 5) is provided values 1 and 2. Though shown conceptually as being a $5^{th}$ input to the (4,2) counter in FIG. 1B, in some embodiments this is actually delivered as part of another input rather than a separate, $5^{th}$ input, to the counter. The choice between '1' or '2' is only 2 bits wide. Some approaches or additional counter(s) can be used to reduce this input. The two carry inputs (124, 126) are assumed to have a '0' in their least significant bit, so one approach is to use those two bits to indicate '1' or '2'.

The outputs of MUXs 1, 2, 3, 4 and 5 (one output each) are provided as input to 4:2 counter 142. One output of counter 142 (the sum term output) is provided to MUX 6 which also takes BS and DS as input. The other output of counter 142 (the carry term output) is provided to MUX 7 which also takes BC and DC as input. MUX 6 is responsible for outputting a BS/DS term and MUX 7 is responsible for outputting a BC/DC term in this example.

Indicators BSodd and DSodd (indicative of whether BS and DS, respectively, are odd) are provided as input to multiplexor 148, the output of which is fed as additional input to MUXs 6 and 7. The output of MUX 6 is provided as input to multiplexor 150 (MUX 8), which selects between a zero-bit shift and a 1-bit shift to its two inputs, while the output of MUX 7 is provided as input to multiplexor 152 (MUX 9), which selects between a zero-bit shift and a 1-bit shift to its two inputs. The output of MUX 8 is/are BS and/or DS value(s) that is/are written to register(s) 120 and/or 122 respectively. The output of MUX 9 is/are BC and/or DC value(s) that is/are written to register(s) 124 and/or 126 respectively.

The shifts of steps 1 and 2a above can be implemented in accordance with the approach of FIG. 1A or using any other technique.

Step 2b is implemented by providing counter 142 with inputs BS via MUX 1, 0, BC via MUX 3, x' via MUX 4, and 1 via MUX 5. The 0 input to counter 142 could flow from register 122 through MUX 2, as one example. Alternatively, a zero value can be created in some multiplexors by the selection of nothing by the MUX, in which case there is no need for involvement of register 122. A sum term (BS″) of the addition of these terms is provided to MUX 6, along with original BS value. A carry term (BC″) of the addition is provided to MUX 7, along with the original BC value. Step 2c is implemented as a selection by MUXs 6 and 7 between the (i) original BS and BC values and (ii) the updated BS and BC values (BS″, BC″). In this regard, the indication as to whether BS is odd is used in this selection, per Step 2c. If BS is not odd, then MUX 6 outputs BS and MUX 7 outputs BC. If instead BS is odd, then MUX 6 outputs the sum term (BS″) output of counter 142 as a new BS and MUX 7 outputs the carry term (BC″) output of counter 142 as a new BC. In either case, the BS and BC terms from MUXs 6 and 7 are fed to MUXs 8 and 9, respectively, for a 1-bit right shift to implement Step 2d. The (shifted) BS and BC terms are fed back to register 120 and 124, respectively, to implement the loop back to Step 2a and iteration if u is still even.

The processing described above with reference to Steps 2b-2d implementing the while loop when u is even is analogous to steps 3b-3d implementing the while loop when v is even. Step 3b is implemented by providing counter 142 with inputs DS via MUX 1, 0 (from register 120, via MUX 2, if register 120 stores the 0, or by MUX 2 selecting nothing), DC via MUX 3, x' via MUX 4, and 1 via MUX 5. A sum term (DS″) of the addition of these terms is provided to MUX 6, along with original DS value. A carry term (D″) of the addition is provided to MUX 7, along with the original DC value. Step 3c is implemented as a selection by MUXs 6 and 7 between (i) the original DS and DC values and (ii) the updated DS and DC values (DS″, DC″). In this regard, the indication as to whether DS is odd is used in this selection, per Step 2c. If DS is not odd, then MUX 6 outputs DS and MUX 7 outputs DC. If instead DS is odd, then MUX 6 outputs the sum term (DS″) output of counter 142 as a new DS and MUX 7 outputs the carry term (DC″) output of counter 142 as a new DC. In either case, the DS and DC terms from MUXs 6 and 7 are fed to MUXs 8 and 9, respectively, for a 1-bit right shift to implement Step 3d. The (shifted) DS and DC terms are fed back to register 122 and 126, respectively, to implement the loop back to Step 3a and iteration if v is still even.

Step 4c1 is implemented by providing counter 142 with inputs BS via MUX 1, DS' via MUX 2, BC via MUX 3, DC' via MUX 4, and 2 via MUX 5. A sum term (BS) of the addition of these four terms is provided to MUX 6 and a carry term (BC) of the addition is provided to MUX 7. These values are fed through MUXs 8 and 9 with no bit shifting (>>0) to registers 120 and 124 respectively.

Implementation of step 4c2 is analogous to that of step 4c1. Specifically, step 4c2 is implemented by providing counter 142 with inputs DS via MUX 1, BS' via MUX 2, DC via MUX 3, BC' via MUX 4, and 2 via MUX 5. A sum term (DS) of the addition of these four terms is provided to MUX 6 and a carry term (DC) of the addition is provided to MUX 7. These values are fed through MUXs 8 and 9 with no bit shifting (>>0) to registers 122 and 126 respectively.

Figure 7:
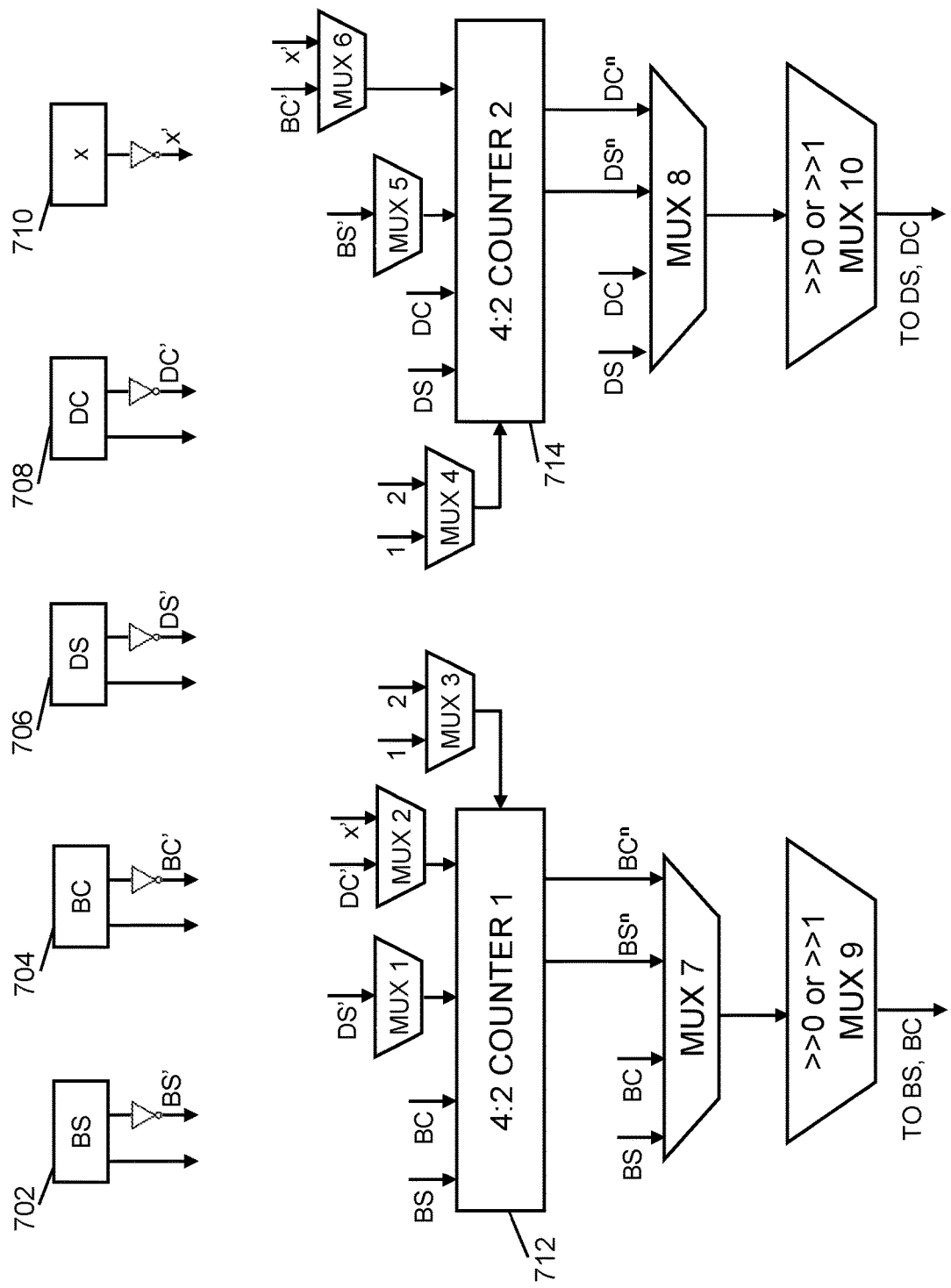
FIG. 7 depicts a conceptual representation of using two (4,2) counters for aspects of greatest common divisor processing.

In an embodiment alternative to that of FIG. 1B, two (4,2) counters are used, for instance for simultaneous processing as depicted and described with reference in FIG. 7. Specifically, 5 registers (702, 704, 706, 708, 710) hold values for BS, BC, DS, DC, and x, respectively. A first (4,2) counter 712 ('4:2 Counter 1') implements step 2b by taking as input BS and BC. DS is fed through an inverter then multiplexor MUX 1 as DS' into the counter 712. DC and x are each fed through a respective inverter into another multiplexor MUX 2 for selection of one (DC' or x') to provide as another input to the counter 712 (i.e. x' in the case of step 2b). Finally, values 1 and 2 are fed into a multiplexor MUX 3 to select one of them (e.g. 1 in Step 2b) as another input to the counter. The sum (BS″) and carry (BC″) outputs from the counter 712 are fed into a multiplexor MUX 7 along with original values BS and BC for selection of either (BS, BC) or (BS″, BC″) for feeding then into another multiplexor MUX 9 that performs either no shift or a 1-bit right shift (e.g.

a 1-bit right shift in the case of step 2a). The output of that final multiplexor MUX 9 is fed back up to the BS and BC registers.

This same counter 712 could be used to implement Step 4c1 by providing the counter with inputs BS, BC, DS', DC', and 2, and feeding the output BS and BC terms through the circuitry (MUX 7, MUX 9) back to up to the BS and BC registers.

Meanwhile, another counter 714 ('4:2 Counter 1') is used to implement steps 3b and 4c2 analogous to the approach just described. Specifically, 5 registers (702-710) hold values for DS, DC, BS, BC, and x. This second (4,2) counter 714 implements step 3b by taking as input DS and DC. BS is fed through an inverter then multiplexor MUX 5 as BS' into the counter 714 BC and x are each fed through a respective inverter into another multiplexor MUX 6 for selection of one (BC' or x') to provide as another input to the counter 714 (i.e. x' in the case of step 3b). Finally, values 1 and 2 are fed into a multiplexor MUX 4 to select one of them (e.g. 1 in Step 3b) as another input to the counter 714. The sum (DS″) and carry (DC″) outputs from the counter 714 are fed into a multiplexor MUX 8 along with original values DS and DC for selection of either (DS, DC) or (DS″, DC″) for feeding then into another multiplexor MUX 10 that performs either no shift or a 1-bit right shift (e.g. a 1-bit right shift in the case of step 3a). The output of that final multiplexor MUX 10 is fed back up to the DS and DC registers. This same counter 714 could be used to implement Step 4c2 by providing the counter 714 with inputs DS, DC, BS', BC', and 2, and feeding the output DS and DC terms through the circuitry (MUX 8, MUX 10) back to up to the DS and DC registers.

Accordingly, aspects leverage a hardware counter and perform arithmetic operations using redundant binary representations, i.e. redundant arithmetic, which provides improvements in the form of reduced delay as compared to ordinary binary/non-redundant arithmetic operations.

Figure 6:
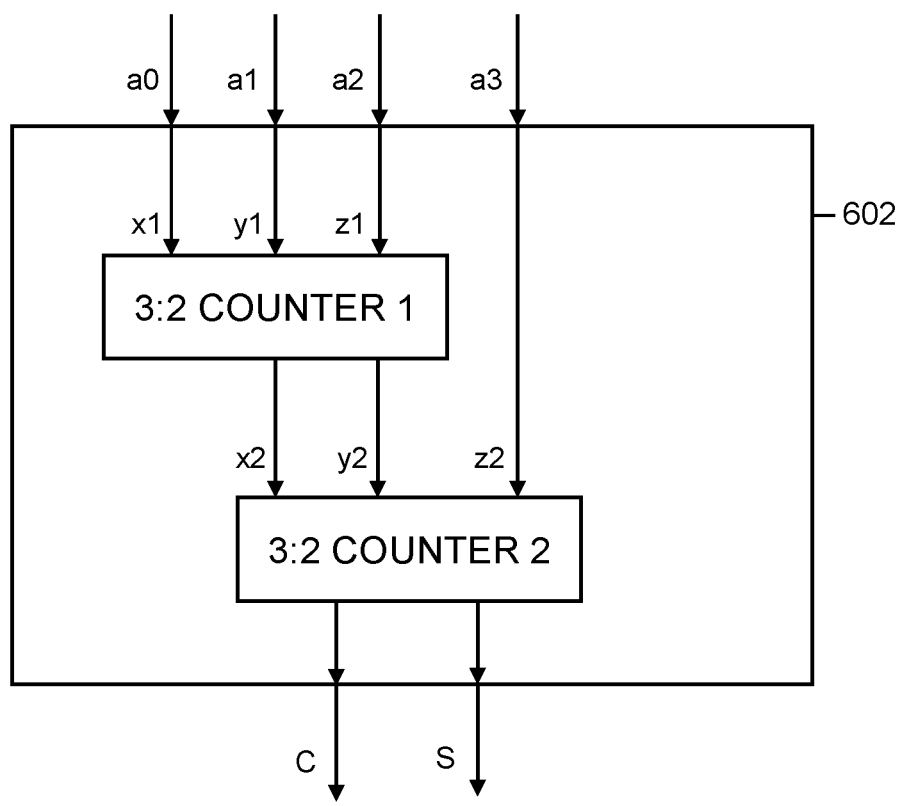
FIG. 6 depicts an example of a (4,2) counter implemented using two (3,2) counters.

It is noted that a (4,2) counter could be physically implemented using two (3,2) counters, if desired. However, techniques exist to make a single 4,2 counter faster than a combination of 3,2 counters. An example implementation of a (4,2) counter physically implemented using two (3,2) counters is depicted in FIG. 6. Block 602 is a (4,2) counter with four inputs a0, a1, a2, and a3, and two outputs C and S. Inputs a0, a1, and a2 are provided as the three inputs x1, y1, z1 to a first 3:2 counter, i.e. '3:2 Counter 1'. First and second outputs of 3:2 Counter 2 are provided (e.g. as carry and sum) as the two outputs of the 4:2 counter 602, i.e. carry and sum outputs. For each of the two 3:2 counters, the carry output C is represented as C=(a and y) OR (y AND z) OR (x and z). The sum output S is represented as S=x XOR y XOR z. C∥S is the two-bit sum of the inputs x+y+z, where x, y, and z are each either 0 or 1. The 4:2 block 602 can be replicated for the number of bits in the operands.

It is also noted that an appropriate (4,2) hardware counter as used herein may not depend on the width of the operands. A counter propagates only up to, e.g. 2 or 3 bits. The delays in adding operands of one length versus adding operations of another, much smaller, length are the same.

Whether the while (u lsb==1) and while (v lsb==1) loops are to be performed in parallel using two discrete hardware counters can dictate a number of registers and counters needed. If the processing is to be performed in parallel, more registers, for instance 10, are to be used with two (4,2) hardware counters.

Aspects describe maintaining B and D in redundant (sum/carry) form and performing arithmetic operations using a hardware counter, thus enabling a full adder to be utilized a minimal as desired.

Improvements and advantages are provided by aspects described herein, for instance the speed increase and avoidance of shifting for alignment (all shifting is productive in the above algorithm implementation). In some aspects, one or two (4,2) hardware counters are leveraged and the 'while u is even' and 'while v is even' processing could be performed simultaneously or concurrently if desired.

A subtraction (i.e. R=u−v) can utilize a 2:1 non-redundant adder to check whether u>=v, since this may be easier by way of non-redundant arithmetic.

In embodiments, implementation of the algorithm as described herein may take at most 2*(lg x+lg y+2) iterations.

Aspects described herein provide advantages over other approaches for GCD/modular multiplicative inverse processing. For instance, an approach may use a more simplistic algorithm to compute a Montgomery Inverse, which calculates $a^{-1}*R$ (mod p) rather than $a^{-1}$ mod p. In contrast, a later multiply using the R value to get back to the original number system is avoided in the above-described example GCD algorithm. Moreover, other approaches do not utilize hardware counter(s) and redundant arithmetic when dealing with larger bit widths, for instance 521-bit numbers. Embodiments described herein can, however, utilize hardware counter(s) and redundant arithmetic as described herein, and perform 521-bit (or more) adds in a single cycle. Using counter(s) enables, e.g., working as part of a more complex formula to produce a full inverse in less time.

One or more aspects of the present invention are inextricably tied to computer technology and facilitate processing within a computer, improving performance thereof. By storing variables in redundant binary representation form and using them in redundant arithmetic operations, including subtractions implemented as two's complement additions, performance is enhanced by, for instance, enabling the computer system to perform GCD/modular multiplicative inverse processing more efficiently with reduced resource (time and energy) consumption. This lends improvements to computer technology and other technology and technical fields, for instance digital security and cryptography processing on computer systems.

Figure 2:
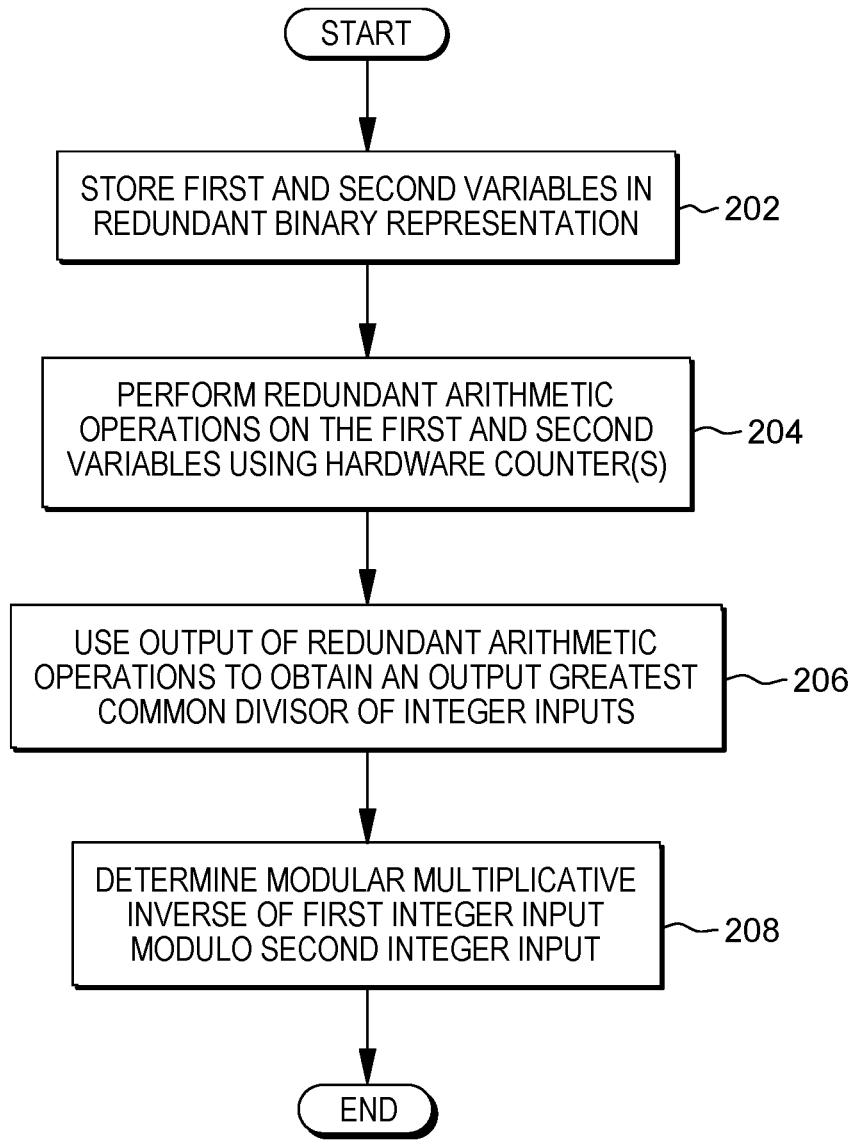
FIG. 2 depicts an example process to facilitate processing of a computer system, in accordance with aspects described herein.

FIG. 2 depicts an example process to facilitate processing of a computer system, in accordance with aspects described herein. The method, for instance, performs processing using hardware counters in the computer system, facilitating efficient GCD/modular multiplicative inverse processing of the computer system.

The process begins by storing (202), in association with greatest common divisor (GCD) processing of the computer system, a first variable (e.g. B or D) of the GCD processing in a first redundant binary representation and a second variable (e.g. D or B) of the GCD processing in a second redundant binary representation. Each redundant binary representation of the first and second redundant binary representations includes a respective sum term and a respective carry term. The numerical value being represented by a redundant binary representation is equal to the sum of the sum term and the carry term of the redundant binary representation.

The process performs (204) redundant arithmetic operations of the GCD processing on the first variable and the second variable using hardware counter(s), of the computer system, that take input values in redundant binary representation form and provide output values in redundant binary representation form. Example such arithmetic operations are the BS+BC<=BS+BC+x'+1, DS+DC<=DS+DC+x'+1, BS+BC<=BS+BC+DS'+DC'+2, and DS+DC<=DS+DC+BS'+BC'+2 operations described above.

The hardware counter(s) of the computer system can be, in one embodiment, a single (4,2) hardware counter, where the (4,2) hardware counter takes four input addends and reduces the four input addends to two output addends. A (4,2) hardware counter takes 4 inputs (addends) to be added and reduces them to two outputs to be added and which have the same sum as the original 4 addends, thus reducing the number of addends. An embodiment using a single (4,2) hardware counter has an advantage that it requires relatively little/minimal hardware to implement. In a particular embodiment, the single (4,2) hardware counter is implemented as two (3,2) counters in hardware, each of the two (3,2) counters taking three input addends and reducing the three input addends to two output addends to be added. An embodiment using two (3,2) hardware counters still has advantages over non-redundant arithmetic using a full adder, since the adder implements non-redundant arithmetic that is slower than redundant arithmetic operations performed by a hardware counter.

Alternatively, the hardware counter(s) can be first and second (4,2) hardware counters, where the using these hardware counters uses the first (4,2) hardware counter to perform addition operations using the first variable and uses the second (4,2) hardware counter to perform addition operations using the second variable. The first and second variables may be B (as BS+BC) and D (as DS+DC), respectively, or vice versa. An embodiment using two single (4,2) hardware counters has an advantage that it they can perform processing of aspects of the algorithm in parallel.

Continuing with the process of FIG. 2, it then proceeds by using (206) output of the redundant arithmetic operations of the GCD processing to obtain an output GCD (i.e. v) of integer inputs to the GCD processing. The integer inputs may be input first and second integers.

A first such integer input of the integer inputs to the GCD processing can be a modulus, m, and a second integer input of the integer inputs can be a number, a, for which a modular multiplicative inverse is to be determined. The GCD (v) returned by the processing is the greatest common divisor of the first and second integers. The process can therefore further include determining (208) the modular multiplicative inverse of a modulo m based on the obtained output GCD. Thus, in one embodiment, based on the output GCD being equal to 1, this determination of the modular multiplicative inverse identifies the modular multiplicative inverse of a modulo m as another output, D, of the GCD processing. An advantage of this is that the efficient GCD processing can be applied to determine a modular multiplicative inverse of input number a modulus m.

The redundant arithmetic operations can include subtraction operations implemented as, e.g., additions using two's complement representations of subtrahends (e.g. x, D or B) of the subtraction operations. The first variable (B or D) may be a subtrahend of a subtraction operation of the subtraction operations, and the subtraction operation can be implemented as an addition using two's complement representations of the sum term (BS or DS) and the carry term (BC or DC) of the first redundant binary representation of the first variable. In such a representation, for each of the sum term (BS or DS) and the carry term (BC or DC), a bitwise inversion of the term (i.e. BS'/BC' or DS'/DC') is added with 1 to a minuend of the subtraction operation. An embodiment implementing subtraction operations as addition operations using the two's complement has an advantage in that it enables the subtraction operations to be performed relatively fast using the hardware counter(s), thus providing the performance benefits of non-redundant arithmetic using hardware counter(s) rather than non-redundant arithmetic using, e.g., a full adder.

In the above example GCD algorithm for use in finding the modular multiplicative inverse, z, of integer, a, mod n in accordance with aspects described herein, the values of the first and second variables (respectively B and D or vice versa, and represented as BC+BS and DC+DS) are modified during the processing of the algorithm, e.g. by way of shifts and addition operations. References to a "variable" herein refers to that variable generally, throughout such processing, even as the value assigned to that variable changes as the processing progresses.

Although various examples are provided, variations are possible without departing from a spirit of the claimed aspects.

Figure 3:
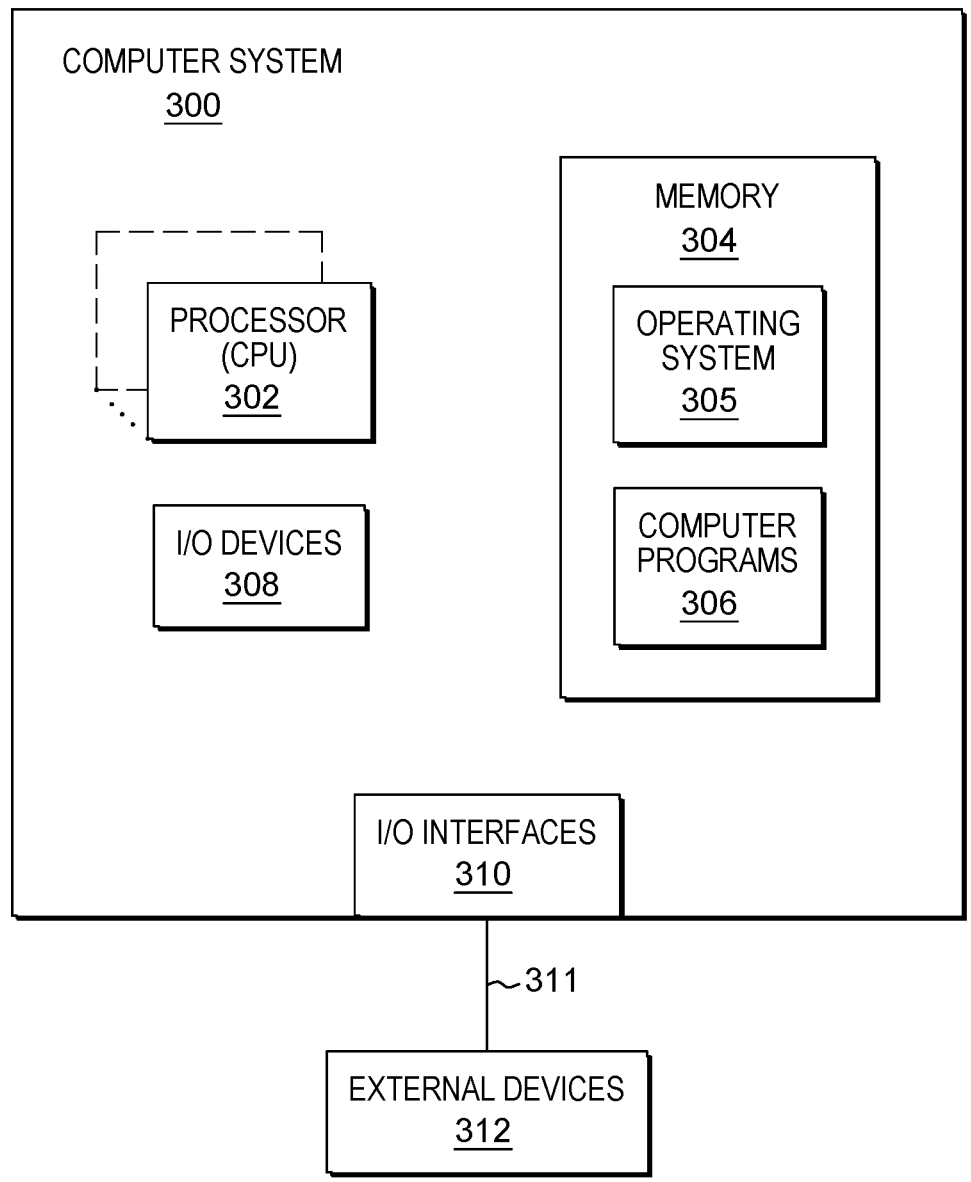
FIG. 3 depicts one example of a computer system and associated devices to incorporate and/or use aspects described herein.

Processes described herein may be performed singly or collectively by one or more computer systems. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) as an example.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
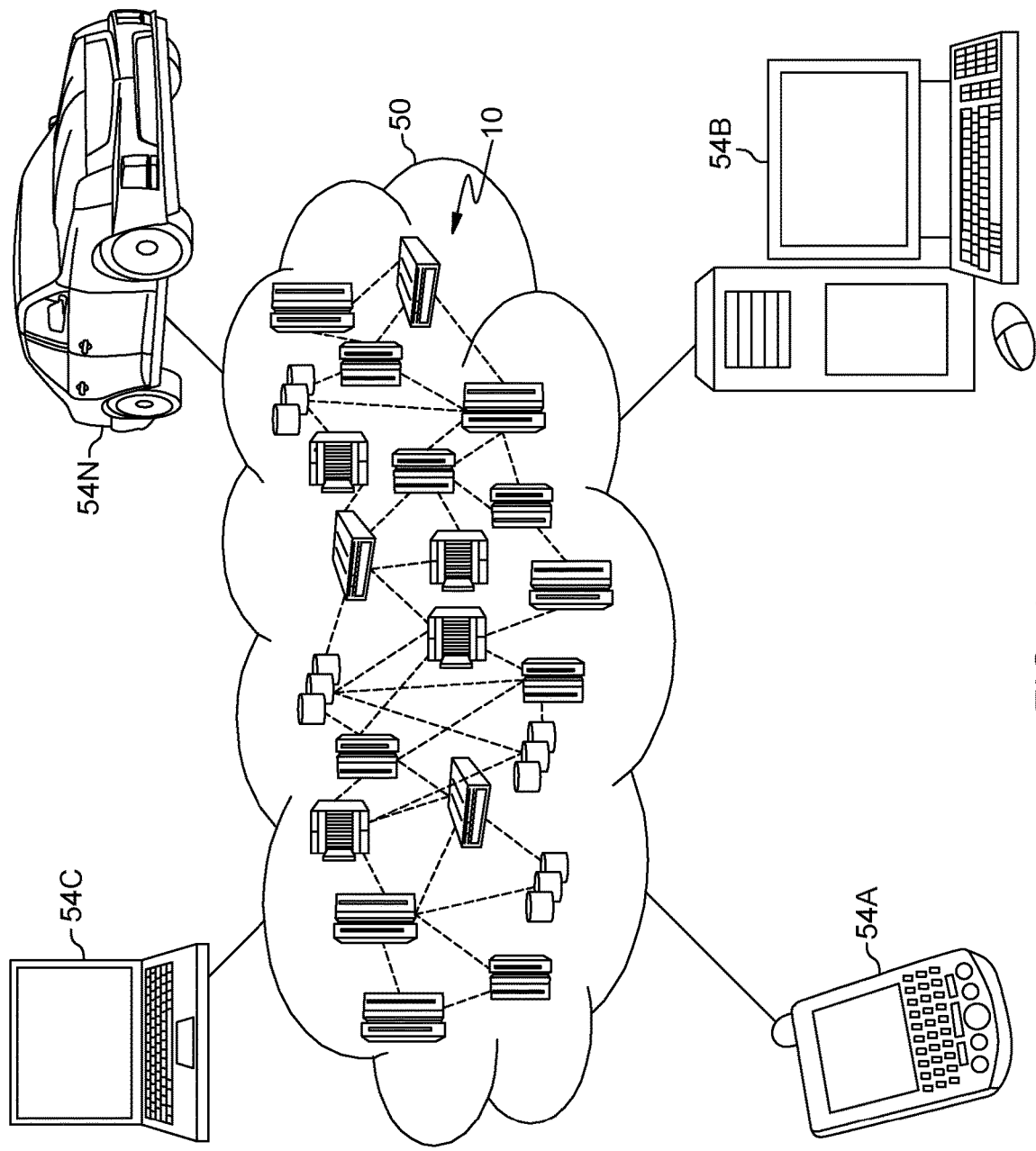
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
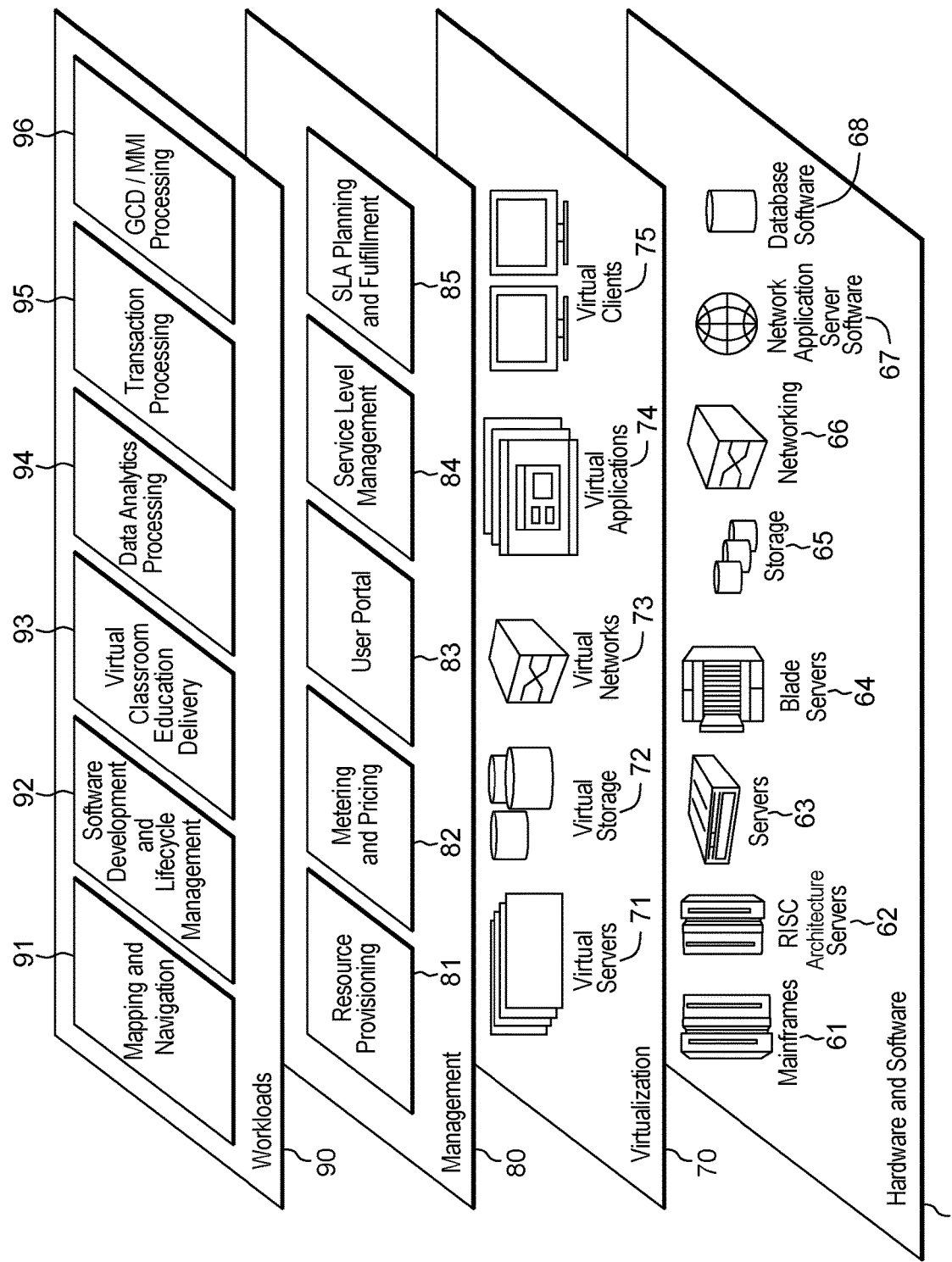
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GCD/modular multiplicative inverse processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method to facilitate processing of a computer system, the method comprising:
    in preparation for greatest common divisor (GCD) processing of the computer system storing a first variable of the GCD processing in a first redundant binary representation and a second variable of the GCD processing in a second redundant binary representation, each of the first and second redundant binary representations comprising a respective sum term and a respective carry term, wherein a numerical value being represented by a redundant binary representation that includes a respective sum term and a respective carry term is equal to a sum of that sum term and that carry term of that redundant binary representation;
    performing redundant arithmetic operations of the GCD processing on the first variable and the second variable using one or more hardware counters, of the computer system, that take input values in redundant binary representation form and provide output values in redundant binary representation form, wherein the redundant arithmetic operations comprise:
        inputting each of the sum term of the first redundant binary representation and the sum term of the second redundant binary representation into a respective one of the one or more hardware counters;
        inputting the carry term of the first redundant binary representation, the carry term of the second redundant binary representation, and a modulus into inverter hardware, the inverter hardware performing bitwise inversions to produce a bitwise-inverted carry term of the first redundant binary representation, bitwise-inverted carry term of the second redundant binary representation, and bitwise-inverted modulus;
        inputting the bitwise-inverted carry term of the first redundant binary representation, the bitwise-inverted carry term of the second redundant binary representation, and the bitwise-inverted modulus into first selection hardware that selectively inputs the bitwise-inverted carry term of the first redundant binary representation, and the bitwise-inverted modulus into the one or more hardware counters;
        inputting to second selection hardware: (i) output of the one or more hardware counters, the output of the one or more hardware counters comprising output first and second sum terms and output first and second carry terms, and (ii) the sum and carry terms of the firsts redundant binary representation, wherein the second selection hardware selects between the (i) output of the one more hardware counters and the (ii) the sum and carry terms of the first redundant binary representation and the sum and carry terms of the second redundant binary representation; and
    using output of the redundant arithmetic operations of the GCD processing to obtain an output GCD of integer inputs to the GCD processing.

2. The method of claim 1, wherein a first integer input of the integer inputs to the GCD processing comprises the modulus, m, and a second integer input of the integer inputs comprises a number, a, for which a modular multiplicative inverse is to be determined, and wherein the method further comprises determining the modular multiplicative inverse of a modulo m based on the obtained output GCD.

3. The method of claim 2, wherein based on the output GCD being equal to 1, the determining identifies the modular multiplicative inverse of a modulo m as an output, D, of the GCD processing.

4. The method of claim 1, wherein the one or more hardware counters of the computer system are a single (4,2) hardware counter that takes four input addends and reduces the four input addends to two output addends.

5. The method of claim 4, wherein the single (4,2) hardware counter is implemented as two (3,2) counters in hardware, each of the two (3,2) counters taking three input addends and reducing the three input addends to two output addends.

6. The method of claim 1, wherein the one or more hardware counters comprise first and second (4,2) hardware counters, and wherein the using the first and second (4,2) hardware counters uses the first (4,2) hardware counter to perform addition operations using the first variable and uses the second (4,2) hardware counter to perform addition operations using the second variable.

7. The method of claim 1, wherein the redundant arithmetic operations comprise subtraction operations implemented as additions using two's complement representations of subtrahends of the subtraction operations, wherein the first variable is a subtrahend of a subtraction operation of the subtraction operations, and wherein the subtraction operation is implemented as an addition using two's complement representations of the sum term and the carry term of the first redundant binary representation of the first variable, in which, for each of the sum term and the carry term, a bitwise inversion of the respective term is added with 1 to a minuend of the subtraction operation.

8. A computer program product to facilitate processing of a computer system, the computer program product comprising:
    a computer readable storage medium readable by a processing circuit and storing instructions for execution by the processing circuit for performing a method comprising:

in preparation for greatest common divisor (GCD) processing of the computer system storing, a first variable of the GCD processing in a first redundant binary representation and a second variable of the GCD processing in a second redundant binary representation, each of the first and second redundant binary representations comprising a respective sum term and a respective carry term, wherein a numerical value being represented by a redundant binary representation that includes a respective sum term and a respective carry term is equal to a sum of that sum term and that carry term of that redundant binary representation;

performing redundant arithmetic operations of the GCD processing on the first variable and the second variable using one or more hardware counters, of the computer system, that take input values in redundant binary representation form and provide output values in redundant binary representation form, wherein the redundant arithmetic operations comprise, inputting each of the sum term of the first redundant binary representation and the sum term of the second redundant binary representation into a respective one of the one or more hardware counters;

inputting the carry term of the first redundant binary representation, the carry term of the second redundant binary representation, and a modulus into inverter hardware, the inverter hardware performing bitwise inversions to produce a bitwise-inverted carry term of the first redundant binary representation, bitwise-inverted carry term of the second redundant binary representation, and bitwise-inverted modulus;

inputting the bitwise-inverted carry term of the first redundant binary representation, the bitwise-inverted carry term of the second redundant binary representation, and the bitwise-inverted modulus into first selection hardware that selectively inputs the bitwise-inverted carry term of the first redundant binary representation, the bitwise inverted carry term of the second redundant binary representation, and the bitwise-inverted modulus into the one or more hardware counters;

inputting to second selection hardware: (i) output of the one or more hardware counters, the output of the one or more hardware counters comprising output first and second sum terms and output first and second carry terms, and (ii) the sum and carry terms of the first redundant binary representation and the sum and carry terms of the second redundant binary representation, wherein the second selection hardware selects between the (i) output of the one or more hardware counters and (ii) the sum and carry terms of the first redundant binary representation and the sum and carry terms of the second redundant binary representation; and using shift hardware to selectively perform shift operations on output of the second selection hardware; and using output of the redundant arithmetic operations of the GCD processing to obtain an output GCD of integer inputs to the GCD processing.

9. The computer program product of claim 8, wherein a first integer input of the integer inputs to the GCD processing the comprises modulus, m, and a second integer input of the integer inputs comprises a number, a, for which a modular multiplicative inverse is to be determined, and wherein the method further comprises determining the modular multiplicative inverse of a modulo m based on the obtained output GCD.

10. The computer program product of claim 9, wherein based on the output GCD being equal to 1, the determining identifies the modular multiplicative inverse of a modulo m as an output, D, of the GCD processing.

11. The computer program product of claim 8, wherein the one or more hardware counters of the computer system are a single (4,2) hardware counter that takes four input addends and reduces the four input addends to two output addends.

12. The computer program product of claim 11, wherein the single (4,2) hardware counter is implemented as two (3,2) counters in hardware, each of the two (3,2) counters taking three input addends and reducing the three input addends to two output addends.

13. The computer program product of claim 8, wherein the one or more hardware counters comprise first and second (4,2) hardware counters, and wherein the using the first and second (4,2) hardware counters uses the first (4,2) hardware counter to perform addition operations using the first variable and uses the second (4,2) hardware counter to perform addition operations using the second variable.

14. The computer program product of claim 8, wherein the redundant arithmetic operations comprise subtraction operations implemented as additions using two's complement representations of subtrahends of the subtraction operations, wherein the first variable is a subtrahend of a subtraction operation of the subtraction operations, and wherein the subtraction operation is implemented as an addition using two's complement representations of the sum term and the carry term of the first redundant binary representation of the first variable, in which, for each of the sum term and the carry term, a bitwise inversion of the respective term is added with 1 to a minuend of the subtraction operation.

15. A computer system comprising:
a memory; and
a processor in communication with the memory, wherein the computer system is configured to perform a method to facilitate processing of the computer system, the method comprising:

in preparation for greatest common divisor (GCD) processing of the computer system, storing, a first variable of the GCD processing in a first redundant binary representation and a second variable of the GCD processing in a second redundant binary representation, each of the first and second redundant binary representations comprising a respective sum term and a respective carry term, wherein a numerical value being represented by a redundant binary representation that includes a respective sum term and a respective carry term is equal to a sum of that sum term and that carry term of that redundant binary representation;

performing redundant arithmetic operations of the GCD processing on the first variable and the second variable using one or more hardware counters, of the computer system, that take input values in redundant binary representation form and provide output values in redundant binary representation form, wherein the redundant arithmetic operations comprise:

inputting each of the sum term of the first redundant binary representation and the sum term of the second redundant binary representation into a respective one of the one or more hardware counters;

inputting the carry term of the first redundant binary representation, the carry term of the second redundant binary representation, and a modulus into inverter hardware, the inverter hardware performing bitwise inversions to produce a bitwise-inverted carry term of the first redundant binary representation, bitwise-inverted carry term of the second redundant binary representation, and bitwise-inverted modulus;

inputting the bitwise-inverted carry term of the first redundant binary representation, the bitwise-inverted carry term of the second redundant binary representation, and the bitwise-inverted modulus into first selection hardware that selectively inputs the bitwise-inverted carry term of the first redundant binary representation, the bitwise-inverted carry term of the second redundant binary representation, and the bitwise-inverted modulus into the one or more hardware counters;

inputting to second selection hardware: (i) output of the one or more hardware counters, the output of the one or more hardware counters comprising output first and second sum terms and output first and second carry terms, and (ii) the sum and carry terms of the first redundant binary representation and the sum and carry terms of the second redundant binary representation, where the second selection hardware selects between the (i) output of the one or more hardware counters and (ii) the sum and carry terms of the first redundant binary representation and the sum and carry terms of the second redundant binary representation; and using shift hardware to selectively perform shift operations on output of the second selection hardware; and using output of the redundant arithmetic operations of the GCD processing to obtain an output GCD of integer inputs to the GCD processing.

16. The computer system of claim 15, wherein a first integer input of the integer inputs to the GCD processing comprises the modulus, m, and a second integer input of the integer inputs comprises a number, a, for which a modular multiplicative inverse is to be determined, wherein the method further comprises determining the modular multiplicative inverse of a modulo m based on the obtained output GCD, and wherein based on the output GCD being equal to 1, the determining identifies the modular multiplicative inverse of a modulo m as an output, D, of the GCD processing.

17. The computer system of claim 15, wherein the one or more hardware counters of the computer system are a single (4,2) hardware counter that takes four input addends and reduces the four input addends to two output addends.

18. The computer system of claim 17, wherein the single (4,2) hardware counter is implemented as two (3,2) counters in hardware, each of the two (3,2) counters taking three input addends and reducing the three input addends to two output addends.

19. The computer system of claim 15, wherein the one or more hardware counters comprise first and second (4,2) hardware counters, and wherein the using the first and second (4,2) hardware counters uses the first (4,2) hardware counter to perform addition operations using the first variable and uses the second (4,2) hardware counter to perform addition operations using the second variable.

20. The computer system of claim 15, wherein the redundant arithmetic operations comprise subtraction operations implemented as additions using two's complement representations of subtrahends of the subtraction operations, wherein the first variable is a subtrahend of a subtraction operation of the subtraction operations, and wherein the subtraction operation is implemented as an addition using two's complement representations of the sum term and the carry term of the first redundant binary representation of the first variable, in which, for each of the sum term and the carry term, a bitwise inversion of the respective term is added with 1 to a minuend of the subtraction operation.

* * * * *